(12) United States Patent
Korajda et al.

(10) Patent No.: US 9,031,804 B2
(45) Date of Patent: May 12, 2015

(54) METHOD AND DEVICE FOR DETERMINING MEASURED VALUES FROM A TIME-DEPENDENT GRAPH

(75) Inventors: Bartosz Korajda, Lohr am Main (DE); Oliver Scheb, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 1326 days.

(21) Appl. No.: 12/339,268

(22) Filed: Dec. 19, 2008

(65) Prior Publication Data

US 2009/0164168 A1 Jun. 25, 2009

(30) Foreign Application Priority Data

Dec. 21, 2007 (DE) .......................... 10 2007 062 335

(51) Int. Cl.
*G06F 15/00* (2006.01)
*G01D 5/244* (2006.01)

(52) U.S. Cl.
CPC .......... *G01D 5/2449* (2013.01); *G01D 5/24452* (2013.01)

(58) Field of Classification Search
USPC .......................................................... 702/89
See application file for complete search history.

(56) References Cited

U.S. PATENT DOCUMENTS

| 5,757,676 | A | 5/1998 | Hobelsberger | |
|---|---|---|---|---|
| 6,225,609 | B1* | 5/2001 | Imanari et al. | 219/494 |
| 6,721,375 | B1 | 4/2004 | Hammel | |
| 2005/0102112 | A1* | 5/2005 | Reichler et al. | 702/45 |
| 2006/0157142 | A1* | 7/2006 | Hillam et al. | 141/198 |

FOREIGN PATENT DOCUMENTS

| DE | 195 36 840 | 4/1997 |
|---|---|---|
| DE | 198 53 897 | 5/2000 |
| JP | 7-253811 | 10/1995 |

* cited by examiner

*Primary Examiner* — Jonathan C Teixeira Moffat
(74) *Attorney, Agent, or Firm* — Michael J. Striker

(57) ABSTRACT

In a method for determining measured values from a time-dependent graph of specified values, a measurement is carried out using a measuring device, and a point in time ($T_M$) that is associated with this measurement is determined. Furthermore, the measured value ($y_E$) is determined by using at least two value pairs ($t_1$, $y_1$; $t_2$, $y_2$) on the time-dependent graph, each value pair ($t_1$, $y_1$; $t_2$, $y_2$) being composed of a point in time ($t_1$; $t_2$) and a value ($y_1$; $y_2$) that is associated with this point in time ($t_1$; $t_2$). The measured value ($y_E$) is determined based on a corrected point in time ($T_K$) which is determined by correcting the point in time ($T_M$) that is associated with the measurement by using a correction term that accounts for a dead time ($T_T$) of the measuring device.

11 Claims, 1 Drawing Sheet

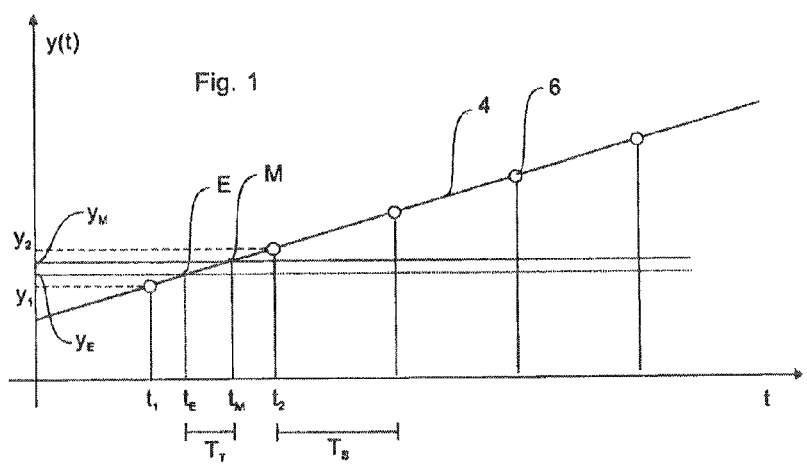
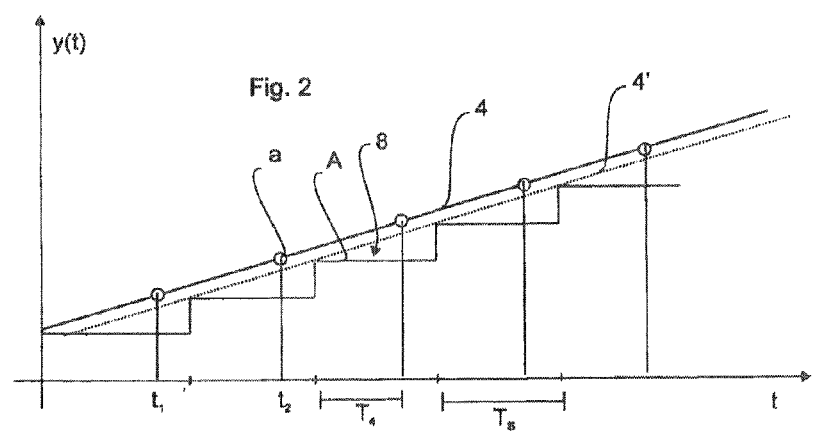

METHOD AND DEVICE FOR DETERMINING MEASURED VALUES FROM A TIME-DEPENDENT GRAPH

BACKGROUND OF THE INVENTION

The present invention relates to a method and a device for determining measured values from a time-dependent graph. The present invention is used, in particular, in the field of packaging machines, printing presses, textile machines, and automation systems. It is also possible to use the method according to the present invention, and the device according to the present invention in systems that are controlled electrically, hydraulically, or pneumatically.

It is known from the prior art to determine measured values from a time-dependent graph by outputting—using a measuring device—a point in time at which a certain measurement took place. The actual measured value may then be determined from the time-dependent graph using a method such as an interpolation method.

As with any analog or digital method of signal processing, dead times occur when using a measuring device of this type, e.g. a sensing probe function. These dead times generally result in measurement errors and therefore reduce the accuracy of the measured result. Dead time in the sensing probe signal and dead time in the sampled values affect the determination of, e.g. position values when using a sensing probe function which is integrated in the controller.

JP 7253811 A makes known a measurement control switching circuit. This switching circuit establishes a dead time for a control signal within specified times.

There are various reasons why dead time may occur in a sensing probe signal. For instance, it is possible for delays to occur in the detection of a trigger event, and in the transmission of the sensing probe signal by various components. The first delay mentioned above occurs in the sensor itself due to the processing—which is usually digital—of the measured quantity, and due to the output drivers that amplify the signal. Within the controller, dead times are caused by a current-limiting input circuit and the optical couplers.

Dead times also result from the clocked processing of the input signal, and from the digital filtering. It is possible to approximately determine the dead times to be expected by referring to data sheets for the particular sensor that is used, and to the data sheets for the control hardware. Suitable measurement series must be carried out in order to determine the exact value for these dead times, however. The above-mentioned dead times of the above-mentioned components result in the particular events being detected too late, thereby resulting in an incorrect time stamp being used as the basis for interpolating the position value or the value to be determined, which, in turn, yields an erroneous result. Due to the dead times mentioned above, it is therefore possible for position errors to occur, in particular in the determination of positive or negative slopes of a graph.

SUMMARY OF THE INVENTION

The object of the present invention, therefore, is to provide a method and a device that make it possible to more exactly determine measured values, in particular with consideration for dead times.

In a method, according to the present invention, for determining measured values from a time-dependent graph of specified values, a measurement is first carried out using a measuring device, and a point in time that is associated with this measurement is determined. Furthermore, a measured value is determined by using at least two value pairs of the time-dependent graph, these value pairs being composed of a point in time and a value that is associated with this point in time. According to the present invention, the measured value is determined based on a corrected point in time which is determined by correcting the point in time that is associated with the measurement by applying a correction term that accounts for a dead time of the measuring device.

In the method according to the present invention, therefore, the measured values are not determined directly; rather, they are determined indirectly based on the times at which a measurement took place. The corresponding measured values are then determined, preferably via interpolation. Since, as mentioned above, the above-mentioned points in time include dead times, this dead time is accounted for in the output of the corrected point in time mentioned above. This corrected point in time is used, in turn, to determine the measured value.

The present invention therefore creates a possibility for correcting the delay which is caused by the digital processing of the measured quantity, and by the output drivers. The delay in the control which is caused by the current-limiting input circuit and the optical couplers may also be corrected. In this manner, it is possible to exactly determine the position values that are determined by the sensing probe, even independently of the speed of the sensor and other physical quantities that may change during the measurement procedure.

In an advantageous method, the correction term includes a time difference between the two points of time in the value pairs. The value pairs are support points, in particular, which are used to determine a time-dependent graph. The time difference between these support points is preferably a cycle time, such as a SERCOS cycle time.

A large number of value pairs which have a constant time difference between them is therefore preferably used to determine the measured values.

In a further preferred method, the correction term is an additive correction term. This means that the point in time is preferably corrected by adding or subtracting certain time-related quantities.

In a further preferred method, the measured values are taken from a group of measured values that includes measured position values, measured torque values, measured force values, measured moment values, measured angular values, and the like. It is therefore possible by using the method according to the present invention, e.g. by referring to measured position values, to determine exact positions, e.g. of a working element, with consideration for dead times of the system.

In a further advantageous method, the measured value is determined using an interpolation method. The time-dependent graph may be, e.g. a linear graph, in which case the measured value is determined by calculating the mean of the two value pairs. The graph may also be based on non-linear relationships, in which case the graph is also determined by performing a suitable interpolation between the two points (with consideration for the functional relationship of the graph).

In a further preferred method, the corrected point in time is analyzed and, depending on this analysis, a whole-number multiple of the time difference from the corrected point in time is added to or subtracted from this point in time. More specifically, a comparison is preferably carried out to determine if the corrected point in time is less than 0 or greater than the time difference between the stated points in time. This is explained in greater detail with reference to the figures.

The present invention is also directed to a device for determining measured values from a time-dependent graph of specified values, this device including a measuring device which determines a point in time that is associated with a measurement that was carried out; the device also includes a processor device which determines a measured value, the processor device being designed in a manner such that it uses at least two value pairs from the time-dependent graph to determine the measured value, each of these value pairs being composed of one point in time and a value that is associated with this point in time. According to the present invention, the processor device is designed such that it determines the measured value based on a corrected point in time which is determined by correcting the point in time that is associated with the measurement by applying a correction term that accounts for a dead time of the measuring device.

BRIEF DESCRIPTION OF THE DRAWINGS

Further advantages and embodiments result from the attached drawings:

FIG. 1 shows a graph as an illustration of the object on which the present invention is based; and FIG. 2 shows a graph as an illustration of the present invention.

DETAILED DESCRIPTION OF THE PREFERRED EMBODIMENTS

FIG. 1 shows a depiction of a functional relationship between values y(t) and the time t, as an illustration of the problem on which the present invention is based. Time t is plotted on the x-axis, and dependent values y(t) are plotted on the y-axis. The y(t) values are position values. FIG. 1 is therefore a actual position value curve 4 having constant motion along the axis. As mentioned above, the values could be moment values, speed values, angular values, force values, or the like.

Reference numeral 6 labels support points which are located along graph 4 and are used to determine actual position values y(t). Reference numeral M relates to a measured point on graph 4. A point in time $t_M$ is registered using a measuring device. Due to a dead time $T_T$ of the measuring device, however, actual point in time $t_E$ of event E is offset by dead time $T_T$. Accordingly, a corrected position value $y_E$ is not output, but rather corresponding position value $y_M(t_M)$.

The position values that are present in the controller therefore also include dead times. Values $t_1$ and $t_2$ and position values $y_2$ and $y_2$ associated therewith are value pairs that are used in the interpolation in order to determine the measured values y(t).

A slight delay occurs even when the particular actual position values are measured by a sensor of the drive. A substantially greater dead time is caused by the fact that a certain amount of time passes from the time that the sensor signal is registered until the measured values are transmitted to the controller. The particular sampling instant is specified by the timing of the interface, in particular a SERCOS interface.

FIG. 2 shows how the dead time that is determined affects the position values. Reference numeral 4 labels a real position graph, and reference numeral 4' labels a position graph that is assumed by the controller. Reference symbol $T_S$ labels the SERCOS cycle time.

Reference symbol $T_4$ describes the "value acquisition time" which indicates the relative point in time at which sampling is carried out, based on the beginning of a SERCOS cycle. The particular sampling values (time values) are transmitted with the drive telegram and are valid as of the beginning of the particular SERCOS cycle.

Due to the above-mentioned dead time, individual points 6 are therefore shifted to the right by the amount of the particular dead time, thereby resulting in position graph 4' which is assumed by the controller, and which deviates from actual position graph 4. Reference numeral 8 labels the particular position values that are present in the controller (and which include dead times).

If, e.g. in the case of the depiction shown in FIG. 2, a measured value a is measured, it is not transmitted until cycle A. At the same time, however, this measured value applies as of the beginning of cycle A which is shown. This results, overall, in position graph 4'. This undesired deviation from the actual position graph is also compensated for by the present invention.

This results, overall, in the delayed transmission of the actual position value shown in FIG. 2. A further dead time results when the drive, the actual position value of which should be detected, is connected to a remote control. The position values are then transmitted in the control network, with the result that the position values are present such that they are delayed by exactly one cycle.

Within the scope of the present invention it is therefore provided to compensate for these dead times once more, with the result that graph 8 shown in FIG. 2 is shifted to the left by the amount of the dead time. In this case, the compensation for the dead time results in the actual position value graph for the position value graph that is assumed by the controller.

To compensate for the dead times that are present, a parametrizable dead-time compensation is integrated in the function—which is integrated in the controller—of the sensor device. This means that the measurement device itself outputs a corrected time value. This dead-time compensation compensates for the delayed transmission of actual values from the drives to the controller. More specifically, the difference between SERCOS cycle time $T_S$ and the $T_4$ point in time is added to counter status $t_M$ that is determined or latched.

The dead time is compensated for by subtracting the parametrized value for dead time $T_T$ from latched counter status $t_M$ that is determined. The following relationship therefore results for the two compensation steps mentioned above:

$$t_{M'} = t_M + T_S - T_4 - T_T,$$

whereby $t_{M'}$ refers to the resultant counter status, $T_S$ refers to SERCOS cycle time, $T_4$ refers to the relative point in time when the position value was acquired, and $T_T$ represents the parametrized dead time. Preferably, the dead time may be specified by the user. The term $T_S - T_4 - T_T$ therefore describes correction term K.

Time constants $T_S$ and $T_4$ are preferably defined when the particular interface or a SERCOS interface is initialized. As soon as the SERCOS interface is operational, the sensor probe function reads out these constants and stores them locally. All of the constants used in the equation shown above and the point in time of the signal edge are therefore present in milliseconds, thereby ensuring that the calculation is relatively easy to perform.

It is also possible to enter a negative value for the compensation. This may be helpful when a dead time occurs due to the transmission of the axis position via the controller network. Values that are greater—in terms of their absolute values—than twice the SERCOS cycle time are preferably rejected. This limitation results from the limited size of the buffer for sensor probe events and for the position values.

Two special cases are possible in terms of determining the resultant slope instant. It is possible for resultant slope instant $t_{M'}$ to be less than 0, and, in another case, it is possible for resultant slope instant $t_{M'}$ to be greater than SERCOS cycle time $T_S$. In the first case, the index that references the sampled value at the instant of the signal slope is reduced. Furthermore, the resultant sampling instant is shifted in the range between 0 and $T_S$ by adding the SERCOS cycle time once or several times. This adjusted value is used to interpolate the position value, thereby yielding the corrected measured value. In this situation, the actual instant of the slope is located in a previous SERCOS cycle. The interpolated position value is therefore located one or two cycles later than would be the case if the signal were detected without dead time. This method is unproblematic, however, in the practical application of a sensor probe function.

If, as described above, the resultant slope instant is greater than the SERCOS cycle time, the calculation is moved backward by one cycle. This means that the index for the actual sampled value becomes larger in this case, and the cycle time is subtracted from the resultant slope instant once or twice. With reference to FIG. 2, this means that the measured instant is shifted to the right or left with regard for the sections formed by the sampling instant.

All of the features disclosed in the application documents are claimed as being essential to the present invention, provided they are novel compared to the prior art, either individually or in combination.

LIST OF REFERENCE NUMERALS

4 Actual position value curve
4' Assumed position graph
6 Support points
8 Graph
K Correction term
M Measuring point
E Event
t Time
$t_E$ Actual point in time
$T_S$ Cycle time
$T_T$ Dead time
$t_K$ Corrected point in time
$t_M$ Measured point in time
$t_1, t_2$ Values
$T_4$ Value acquisition time
y(t) Position values
$y_E$ Corrected position value
$y_M$ Corresponding position value
$y_1, y_2$ Position values
a Measured value
A Cycle

What is claimed is:

1. A method for determining a measured value from a time-dependent graph of specified values, comprising the steps:
   providing a measuring device;
   providing a processor device configured to determine the measured value;
   performing by said measuring device a measurement using said measuring device;
   determining by said measuring device a point in time ($T_M$) that is associated with said measurement;
   determining by said processor device the measured value ($y_E$) by using at least two pairs of values ($t_1, y_1; t_2, y_2$) on the time-dependent graph, each said at least two pair of values ($t_1, y_1; t_2, y_2$) being composed of a point in time ($t_1; t_2$) and a value ($y_1; y_2$) that is associated with said point in time ($t_1; t_2$), wherein the measured value ($y_E$) is determined based on a corrected point in time ($T_K$) which is determined by correcting the point in time ($T_M$) that is associated with the measurement by applying a correction term which accounts for a dead time ($T_T$) of the measuring device; and
   performing said method in an apparatus or system selected from a group consisting of a packaging system, a printing press, a textile machine, and an automation system.

2. The method as recited in claim 1, wherein the correction term includes a time difference ($T_S$) between the two points in time ($t_1; t_2$) of the value pairs ($t_1, y_1; t_2, y_2$).

3. The method as recited in claim 1, wherein
   a number of said value pairs having a constant time difference ($T_S$) between them is used to determine the measured value ($y_E$).

4. The method as recited in claim 1, wherein the correction term is an additive correction term.

5. The method as recited in claim 1, wherein the dead time ($T_T$) is specifiable by a user.

6. The method as recited in claim 1, wherein
   the correction term accounts for a relative point in time ($T_4$) of a value acquisition.

7. The method as recited in claim 4, wherein
   the correction term accounts for the dead time ($T_T$) of the measuring device as an additive term.

8. The method as recited in claim 1, wherein
   the measured values are taken from a group of measured values selected from a group consisting of measured position values, measured torque values, measured force values, measured moment values, and measured angular values.

9. The method as recited in claim 1, wherein
   the measured value ($y_E$) is determined using an interpolation method.

10. The method as recited in claim 1, wherein
    the corrected point in time is analyzed and, depending on this analysis, a whole-number multiple of the time difference from the corrected point in time is added to or subtracted from this point in time.

11. A device for determining a measured value from a time-dependent graph of specified values, comprising:
    a measuring device configured to determine a point in time ($T_M$) that is associated with a measurement that was carried out; and
    a processor device configured to determine the measured value, the processor device being configured to use at least two value pairs ($t_1, y_1; t_2, y_2$) of the time-dependent graph to determine the measured value ($y_E$), each of said at least two value pairs ($t_1, y_1; t_2, y_2$) being composed of a point in time ($t_1; t_2$) and a value ($y_1; y_2$) that is associated with said point in time ($t_1; t_2$), wherein the processor device is configured to determine the measured value based on a corrected point in time, and wherein the processor device is further configured to determine the corrected point in time by correcting the point in time ($T_M$) that is associated with the measurement by applying a correction term that accounts for a dead time ($T_T$) of the measuring device, and
    wherein said device is configured for use in an apparatus or system selected from a group consisting of a packaging system, a printing press, a textile machine, and an automation system.

* * * * *